United States Patent
Nathan et al.

(10) Patent No.: US 8,118,367 B2
(45) Date of Patent: Feb. 21, 2012

(54) MULTI-LOAD FLOOR SMARTFOLD HYBRID

(75) Inventors: John F. Nathan, Highland Township, MI (US); H. Winston Maue, Farmington Hills, MI (US); Mark Keyser, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 467 days.

(21) Appl. No.: 12/202,818

(22) Filed: Sep. 2, 2008

(65) Prior Publication Data

US 2009/0079249 A1   Mar. 26, 2009

Related U.S. Application Data

(60) Provisional application No. 60/995,286, filed on Sep. 26, 2007.

(51) Int. Cl.
*B60N 2/02*   (2006.01)

(52) U.S. Cl. .................. 297/362.11; 297/378.14

(58) Field of Classification Search ............ 297/378.12, 297/378.14, 356, 362.11
See application file for complete search history.

(56) References Cited

U.S. PATENT DOCUMENTS

| | | | | |
|---|---|---|---|---|
| 4,558,903 A * | 12/1985 | Takagi | ............ | 297/408 |
| 4,640,549 A * | 2/1987 | Yokota | ............ | 297/410 |
| 5,590,933 A * | 1/1997 | Andersson | ............ | 297/408 |
| 5,810,444 A * | 9/1998 | Refior et al. | ............ | 297/378.12 |
| 6,112,370 A * | 9/2000 | Blanchard et al. | ............ | 16/325 |
| 6,149,235 A * | 11/2000 | Fahim | ............ | 297/259.2 |
| 6,209,955 B1 * | 4/2001 | Seibold | ............ | 297/216.13 |
| 6,910,739 B2 * | 6/2005 | Grable et al. | ............ | 297/378.12 |
| 7,152,922 B2 * | 12/2006 | Garland | ............ | 297/362.11 |
| 7,364,237 B2 * | 4/2008 | Grable et al. | ............ | 297/378.1 |
| 7,367,624 B2 * | 5/2008 | Garland | ............ | 297/362.11 |
| 7,380,885 B2 * | 6/2008 | Fischer et al. | ............ | 297/378.12 |
| 7,425,038 B2 * | 9/2008 | Deptolla | ............ | 297/362.11 |
| 2003/0080601 A1 * | 5/2003 | Charras et al. | ............ | 297/378.12 |
| 2008/0252129 A1 * | 10/2008 | Nathan et al. | ............ | 297/378.11 |

FOREIGN PATENT DOCUMENTS

| | | |
|---|---|---|
| DE | 102004025179 A1 | 12/2005 |
| DE | 102005052201 A1 | 5/2007 |
| DE | 202006001353 A1 | 7/2007 |

OTHER PUBLICATIONS

German Office Action for corresponding Application No. 10 2008 049 053.9, mailed Feb. 9, 2010, 3 pages.

* cited by examiner

*Primary Examiner* — David Dunn
*Assistant Examiner* — David E Allred
(74) *Attorney, Agent, or Firm* — Brooks Kushman P.C.

(57) ABSTRACT

A seat support system for supporting a seat in a manner that ameliorates or eliminates load applied to a driving mechanism. The system may be configured to support a seat back when the seat back in pivoted upwardly and downwardly relative to a seat bottom. The support system may create a load-bearing link between a non-driven component on the seat back and an anchor.

12 Claims, 6 Drawing Sheets

MULTI-LOAD FLOOR SMARTFOLD HYBRID

CROSS-REFERENCE TO RELATED APPLICATION

This application claims the benefit of U.S. provisional application Ser. No. 60/995,286 filed Sep. 26, 2007.

BACKGROUND OF THE INVENTION

1. Field of the Invention

The present invention relates to seat support systems of the type that loading on certain seating components when a seat back is in a folded position.

2. Background Art

In vehicle seating systems and other seating system, a seat back may be configured to fold relative to a seat bottom. The seat may include any number of components to facilitate folding the seat back. Some of the components may be mechanically powered components, such as but not limited to springs and levers, or electrically powered components, such as but not limited to electrical motors and actuators. These and other components, which may also be referred to as drive components, may be used to rotate the seat back upwardly and downwardly about a rear portion of the seat bottom.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
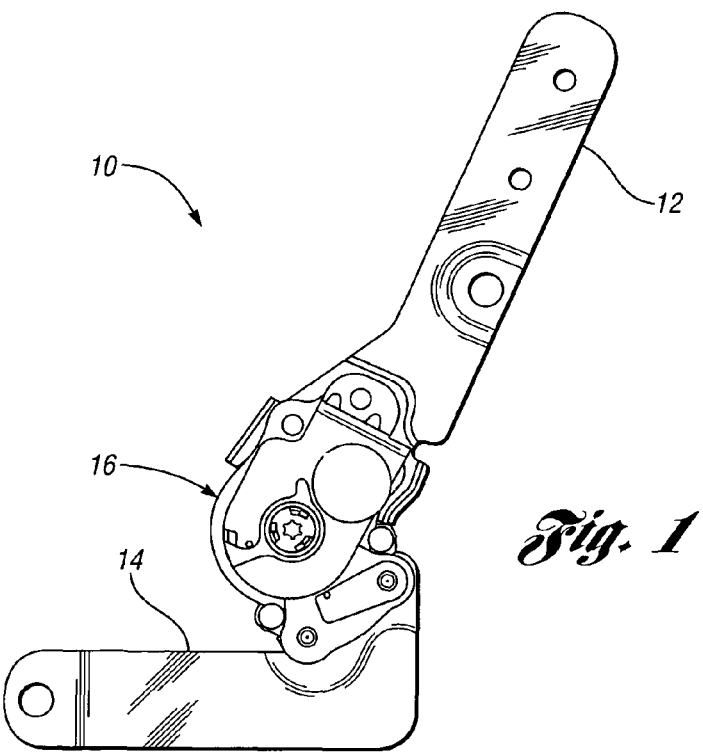
FIG. 1 illustrates a seat support system in accordance with one non-limiting aspect of the present invention.

FIG. 1 illustrates a seat support system 10 in accordance with one non-limiting aspect of the present invention. The system 10 may be configured for use with any seat and is shown for exemplary purposes, and without intending to limit the scope and contemplation of the present invention, as adapted for use with a vehicle seat. The system 10 may be configured to support loads upon a seat back, such as when the seat back is in a folded position. The system 10 can be helpful in ameliorating and/or eliminating loads that would otherwise be born by drive components.

The system 10 may include a seat back bracket 12, a seat bottom bracket 14, and a drive mechanism. Seat cushions (not shown) may be attached to the brackets 12, 14 to provide a seat bottom and seat back for a seat occupant (not shown). The drive mechanism 16 may be used to automatically actuate the seat back relative to the seat bottom, such as to facilitate moving the seat back from an upright to a folded position. The seat support system 10 may be mounted or otherwise adapted to the drive mechanism 16, seat back bracket 12, and/or seat bottom bracket 14.

Figure 2:
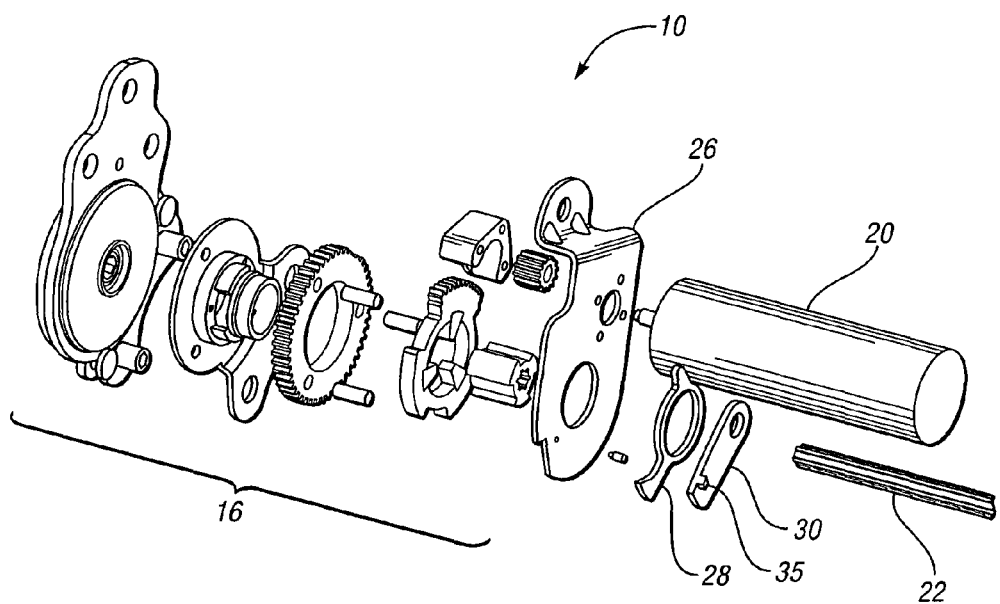
FIG. 2 illustrates an assembly view of the support system in accordance with one non-limiting aspect of the present invention.

FIG. 2 illustrates an assembly view of the seat support system 10 as attached to the drive mechanism 16 in accordance with one non-limiting aspect of the present invention. A motor 20 may be included to actuate the drive mechanism 16 and the other components to facilitate moving the seat back between the upright and folded positions, such as in response to commands of a controller. While described with respect to a motor-driven vehicle seat, the present invention is not intended to be so limited and fully contemplates the seat support system 10 being adapted for use with a manual or other non-motor driven vehicle seat. A torque bar 22 may be used to transfer torque to an optional mirrored locking mechanism and seat support system included on the other side of the seat.

The seat support system 10 may include a support bracket 26, shutter 28, and pawl 30. The support bracket 26 and shutter 28 may be secured to each other and/or the seat back bracket 12 about a pivot such that both features are capable of rotating with rotation of the seat back. The shutter 28 and pawl 30 may be biased with springs or other features (not shown) such that both elements rotate in a counter-clockwise direction in the absence of force in the clockwise direction.

Figure 3:
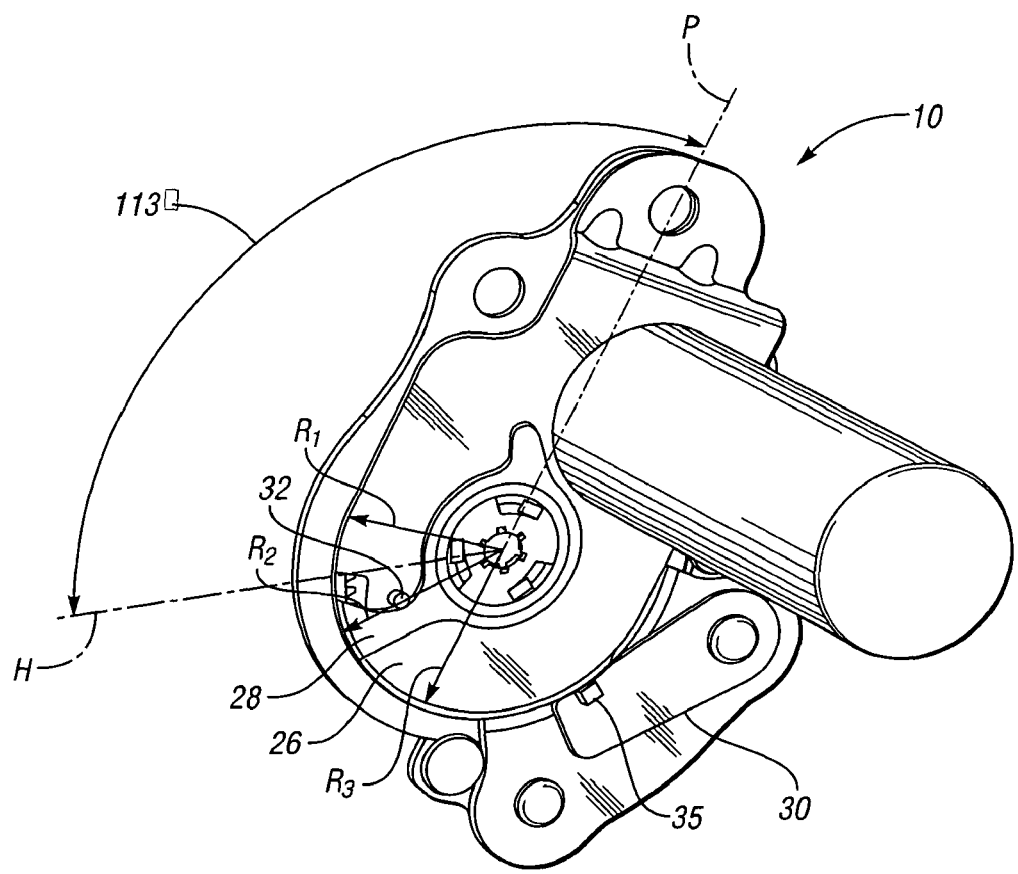
FIGS. 3-18 illustrate actuation of a load-bearing portion of the seat support system in accordance with one non-limiting aspect of the present invention.

FIG. 3 illustrates the seat support system 10 in a design position. The design position may correspond with any desired positioning of the seat back relative to the seat bottom, which typically corresponds with a position selected by the occupant. As shown, the design position corresponds with the seat back in a slightly reclined position. The illustrated angle of the seat back (seat angle) may be defined relative to a reference plane P and horizontal plane H, which for exemplary purposes is selected to be 113.46°. FIG. 3 further illustrates the shutter 28 being spring loaded against a pin 32 included on the bracket 26 and the pawl 30 being spring loaded against a bottom side of the bracket 26.

Figure 4:
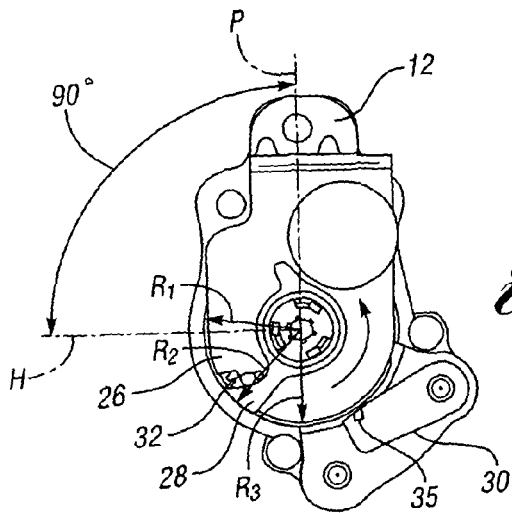
Figure 5:
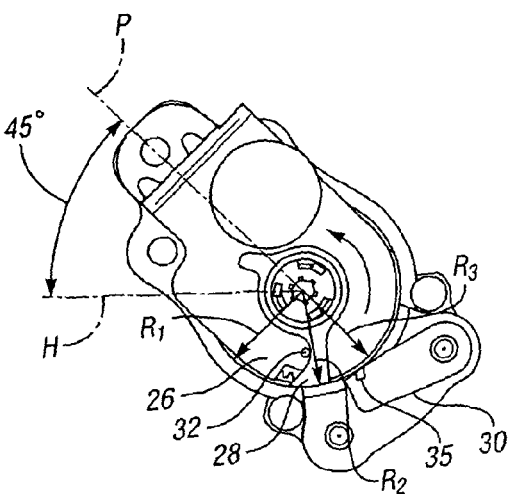
Figure 6:
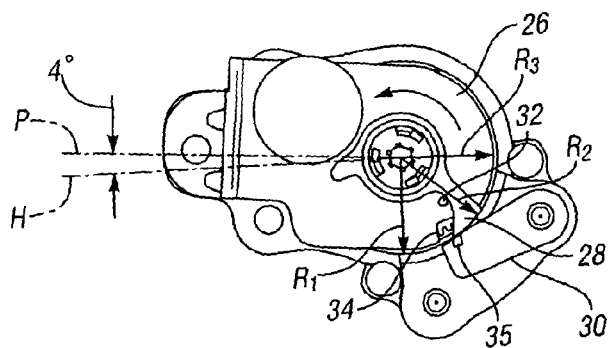

FIG. 4 illustrates rotation of the seat back forwardly from the design position to a seat angle of 90°. Relative to the design position, the seat back bracket 12 is pivoted about the pivot to cause the shutter 28 to rotate in a counter-clockwise direction. The rotation of the seat back bracket 12 further causes the bottom portion of the bracket 26 to rotate against the pawl 30. FIG. 5 illustrates the continued forward rotation of the seat back to a seat angle of 45° where the shutter 28 continues to rotate with the seat back bracket 12 and the pawl 30 continues to bear against the bottom side of the bracket 26. FIG. 6 illustrates the continued forward rotation of the seat back to a seat angle of 4°.

At this folded-forward position, gap between the reference plane P and the horizontal plane H, which for exemplary purposes corresponds with a 4° gap, is provided to show a planar load floor. Optionally, some clearance for a seat located in front of the vehicle seat is provided with the gap, i.e., the illustrated vehicle seat may correspond with a third row seat such that it is folded or tumbled forwardly toward a second row seat and aligns with a top side of that seat.

This allows the present invention to fold the seat back to a point above the horizontal plane H that is sufficient for aligning with an elevation of the forward seat and/or for another reason, such as to provide clearance for seat belts or other features included within the vehicle. Of course, the present invention is not intended to be so limited and fully contemplates any gap between the reference plane P and horizontal plane H and/or the absence of a gap such that the reference plane P and horizontal plane H form the same plane.

Figure 7:
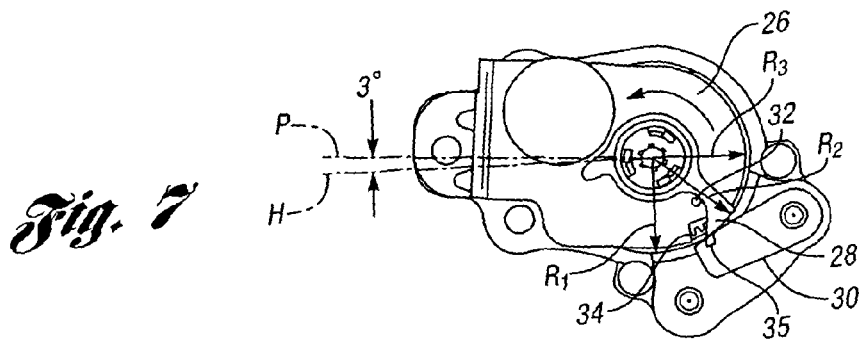
Figure 8:
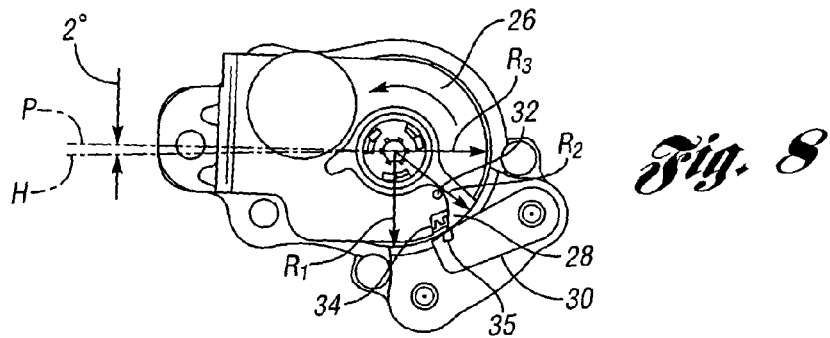
Figure 9:
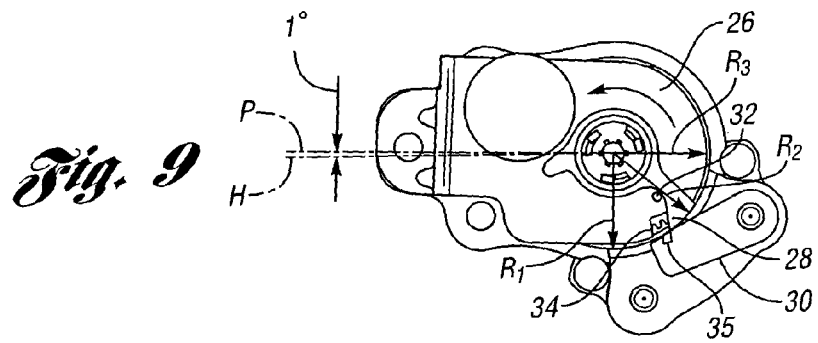

As, the gap decreases between reference planes P and H, the pawl 30 moves towards alignment with a recess 34 included on the support bracket 26. The shutter 28, however, is positioned relative to the pin 32 such that it prevents the spring loaded pawl 30 from rotating into the opening 34. The forward end portion of the pawl 30 is within the boundaries of the recess 34 such that the pawl 30 would be free to rotate into the recess 34 if not blocked by the shutter 28. FIGS. 7-9 illustrate further rotation of the seat back and show the shutter 28 still blocking the pawl 30 until the forward end of the pawl 30 overtakes the forward end of the recess 34.

Figure 10:
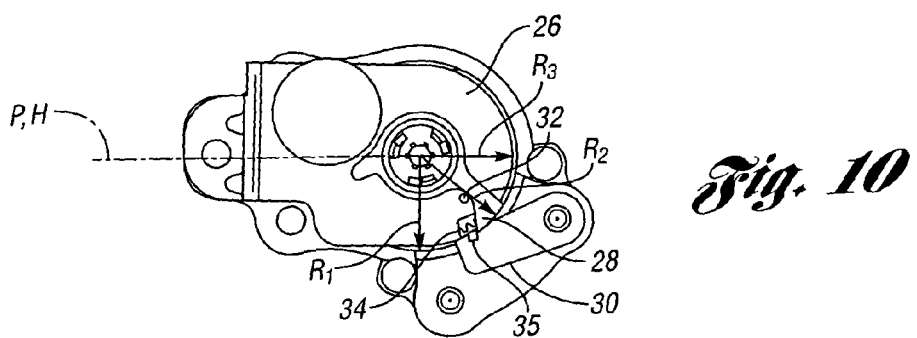
Figure 11:
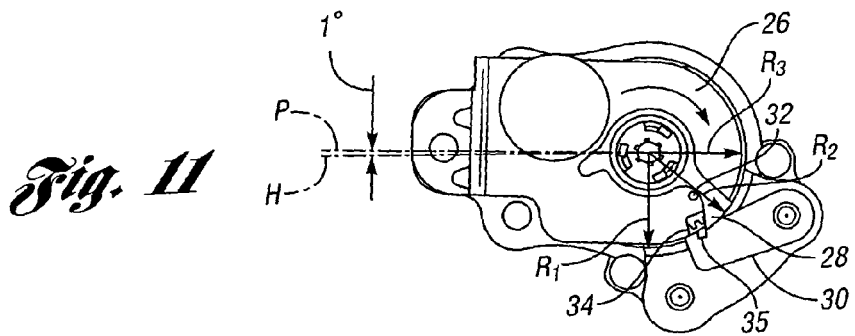

FIG. 10 illustrates rotation of the seat back to a seat angle of 0°, i.e., rotation to the reference plane P where the shutter 28 is now clear of the pawl 30 and the pawl is blocked from entering the recess 34 by the forward end of the recess 34. FIG. 11 illustrates the seat back rotating backwardly from the reference plane (FIG. 10) to a seat angle of f where the shutter 28 drops below the top surface of a pin included on the pawl 30. The shutter 28 may include a slightly larger radius than the portion of the bracket 26 such that the pawl 30 rests against the bracket 26 and the pin of the pawl 30 obstructs the shutter 28 when the seat back is rotated backwardly from 0°.

Figure 12:
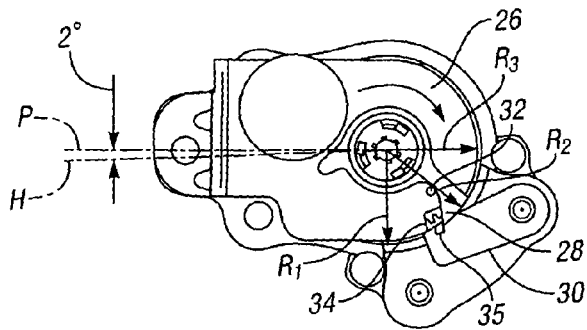
Figure 13:
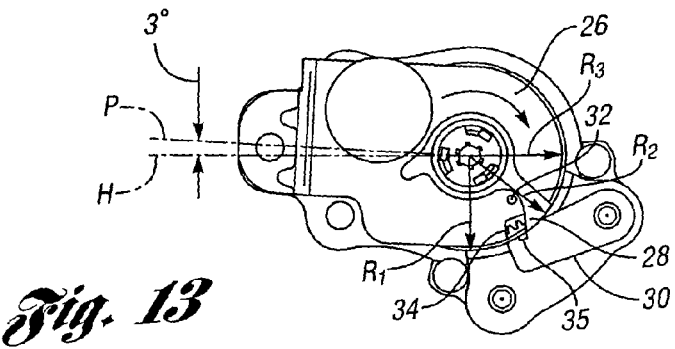
Figure 14:
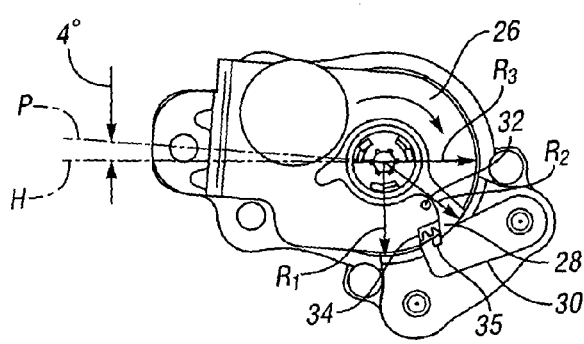

FIGS. 12-14 illustrate further backward rotation of the seat back to a seat angle of 4°. As the seat back rotates, the pawl 30 continues to block the shutter 28 such that a gap forms between the pin 32 and the shutter 28. The continued rotation of the bracket 26 further causes the forward end of the recess 34 to travel along the front end of the pawl 30 until the front end of the pawl 30 is almost unobstructed by the bracket 26.

Figure 15:
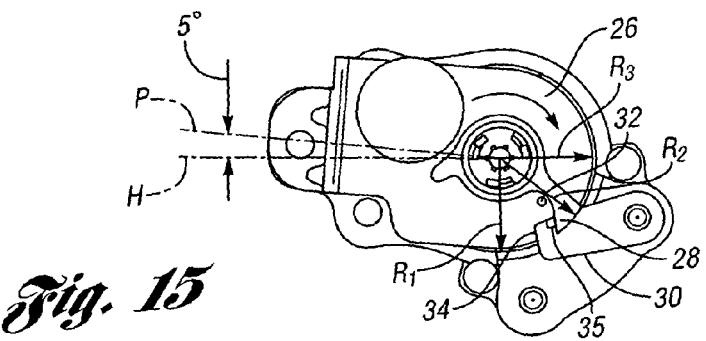

FIG. 15 illustrates rotation of the seat back to a seat angle of 5 where the pawl 30 is no longer obstructed by the bracket 26 or the shutter 28 such that it is free to rotate into the recess 34. A slight gap may be formed between the front end of recess and the front end of the pawl 30 that is sufficient to allow the pawl 30 to nest within the recess 34. In this position, weight pressing down against the seat back bracket 12 is born with the pawl 30 and not the drive mechanism 16. This provides a load bearing function that protects the drive mechanism 16.

Figure 16:
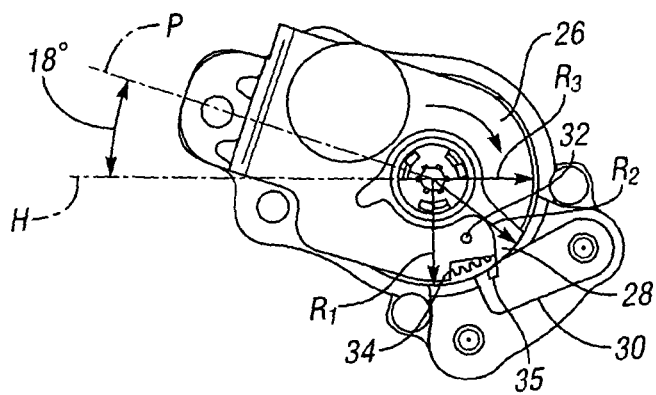

FIG. 16 illustrates continued backward rotation of the seat back to a seat angle of 18° where the rear side of the recess 34 contacts the pawl 30 to push the pawl 30 out of the recess 34. At the illustrated angle, the outside edge of the pawl 30 is almost aligned with the shutter 28 such that any further backward rotation will allow the shutter 28 to rotate back and cover the pawl 30, preventing the pawl 30 from re-entering the recess 34, at least until the seat back is returned to the position shown in FIG. 10.

Figure 17:
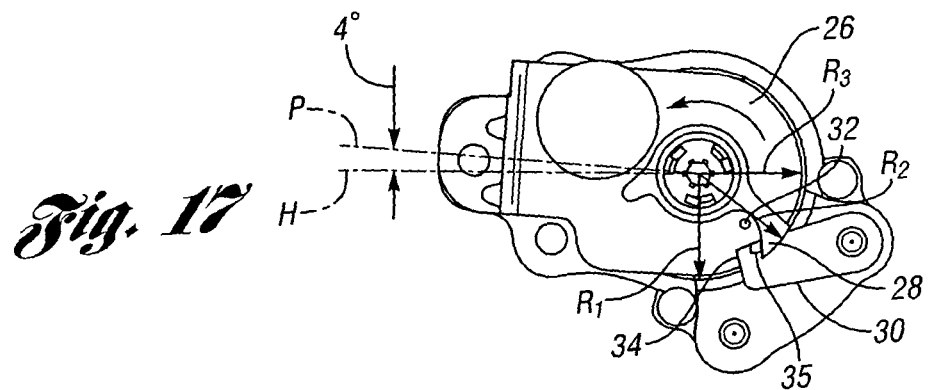

FIG. 17 illustrates forward rotation of the seat back to the seat angle of 4 prior to the seat back being rotated past the point illustrated in FIG. 16. At this angle, the gap between the front end of the nested pawl 30 and the front portion of the recess 34 (FIG. 15) is removed such that the pawl 30 abuts the bracket 26. The contact of the pawl 30 to the bracket 26 forms a load-bearing linkage between the bracket 26 and pawl 30. In this 'locked' position, the support system performs a load-bearing function where it can be used to support the seat back, such as with use of the gears shown in FIG. 2a, instead of relying on the drive mechanism 16 and/or motor to support the seat back, i.e., the motor 20 may be required to provide torque in order to hold the seat back at the reference plane P, and above the horizontal plane H, in the absence of the described linkage support system.

Figure 18:
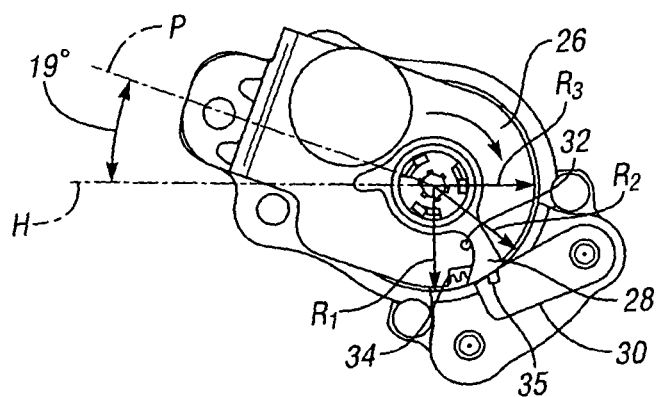

FIG. 18 illustrates backward rotation of the seat back from one of the positions where the pawl 30 is nested at least partially within the recess 34 to a seat angle of 19° where the portion ($R_3$) of bracket 26 rearward of the recess 34 having a larger radius than the forward portion ($R_1$ forces the pawl 30 out of the way of the shutter 28 (e.g., $R_1$=34 mm, $R_2$=35 mm, and $R_3$=35.5 mm). Once the shutter 28 is clear of the pin on the pawl 30, the spring loaded shutter 28 rotates back to cover the pawl 30 and prevent the pawl 30 from entering the recess 34. From this position, the seat back may be returned to the design position for receipt of an occupant. The drive mechanism 16 or other seat element may then provide a structure for supporting the seat back.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat back support system comprising:
   a support bracket configured to be fixed to a seat back support, the seat back support being rotatable about an axis to a desired seat back angle, the support bracket including a recess;
   a pawl configured to pivotably engage and disengage the recess in the support bracket, wherein the pawl engages the recess when the support bracket is in a folded-forward seat back angle to create a load-bearing linkage between the support bracket and a pawl pivot; and
   a shutter positioned between the pawl and recess to pivotally cover and uncover at least a portion of the recess, the shutter covering the recess to prevent the pawl from pivoting into engagement with the recess until the seat back, when started from a design seat back angle, is folded forwardly past the folded-forward seat back angle.

2. The arrangement of claim 1 wherein the support bracket cannot again be folded past the folded-forward position, after the pawl engages the recess, until the support bracket is folded upwardly past an unlocking position.

3. The arrangement of claim 2 wherein the unlocking position corresponds with a partially folded position of the support bracket that is downward relative to the design position.

4. The arrangement of claim 1 wherein the pawl includes a head and a pin, the head being a portion of the pawl positioned forwardly and inwardly of the pin, the head engaging the forward end of the recess when the pawl pivots into the recess.

5. The arrangement of claim 4 wherein the pin engages an underside of the shutter when the shutter prevents the pawl from pivoting upwardly into the recess and wherein the pin engages a side of the shutter above the underside of the shutter after the pawl pivots upwardly into the recess.

6. The arrangement of claim 4 wherein a pin on the support bracket moves the shutter rearwardly once the seat back is folded past the folded-forward position.

7. The arrangement of claim 6 wherein the pin on the support bracket engages the side of the shutter and the head engages a portion of the seat back in front of the recess only after the tab moves the shutter rearwardly.

8. The system of claim 1 wherein the support bracket and shutter pivot about a first axis and the pawl pivots about a second axis.

9. The system of claim 1 further comprising at least one tooth-shaped gear that operates independently of the recess to support the seat back in position, the load-bearing linkage ameliorating loading on the at least one tooth-shaped gear when the pawl engages the recess.

10. A seating system comprising:
   an electrically driven motor that controllably folds a seat back upwardly and downwardly about a rearward portion of a seat bottom;
   a pawl configured to engage and disengage a recess in the seat back, wherein the pawl engages a forward end of the recess when the seat back is in a folded-forward position to create a load-bearing linkage between the seat back and a pawl pivot;
   a shutter covering an entrance to the recess to prevent the pawl from pivoting into the recess until the seat back, when started from a design position, is folded forwardly past the folded-forward position; and
   a controller configured to control folding of the seat back performed by the motor, wherein the controller controls the motor to engage the pawl with the forward end of the recess in a manner that eliminates torque on the motor caused by force being applied to a top side of the seat back when the seat back is in the folded-forward position.

11. The system of claim 10 wherein the electrically driven motor cooperates with a first tooth-shaped gear and a second tooth-shaped gear to support the seat back in position, the load-bearing linkage ameliorating loading on the first and second tooth-shaped gears when the pawl engages the forward end of the recess.

12. The system of claim 10 wherein the pawl blocks any further forward rotation of the seat back when engaged within the recess until the seat back pivots rearwardly a predefined amount.

* * * * *